(12) United States Patent
Lewis

(10) Patent No.: US 6,213,391 B1
(45) Date of Patent: Apr. 10, 2001

(54) PORTABLE SYSTEM FOR PERSONAL IDENTIFICATION BASED UPON DISTINCTIVE CHARACTERISTICS OF THE USER

(76) Inventor: William H. Lewis, P.O. Box 12068, Alexandria, LA (US) 71315

( * ) Notice: Subject to any disclaimer, the term of this patent is extended or adjusted under 35 U.S.C. 154(b) by 0 days.

(21) Appl. No.: 08/926,230

(22) Filed: Sep. 10, 1997

(51) Int. Cl.[7] ..................................................... G06K 5/00

(52) U.S. Cl. ..................... 235/380; 235/382.5; 235/492; 705/44

(58) Field of Search ................................... 235/380, 376, 235/379, 382, 382.5, 451, 470, 492; 902/2, 3, 4, 5, 26; 705/42, 43, 44; 713/182, 185, 186

(56) References Cited

U.S. PATENT DOCUMENTS

| | | | |
|---|---|---|---|
| 4,148,012 | * | 4/1979 | Baump et al. .................. 340/825.32 |
| 4,218,738 | * | 8/1980 | Matyas et al. .......................... 705/72 |
| 4,264,782 | * | 4/1981 | Konheim ................................ 380/25 |
| 4,315,101 | * | 2/1982 | Atella .................................... 705/75 |
| 4,438,824 | * | 3/1984 | Mueller-Schloer ............... 178/22.08 |
| 4,630,201 | * | 12/1986 | White ................................ 235/379 X |
| 4,804,825 | * | 2/1989 | Bitoh .................................... 235/380 |
| 4,825,050 | * | 4/1989 | Griffith et al. ........................ 235/379 |
| 4,827,518 | | 5/1989 | Feustal et al. ......................... 381/42 |
| 4,961,229 | | 10/1990 | Takahashi ............................. 381/42 |
| 4,993,068 | * | 2/1991 | Piosenka et al. ...................... 380/23 |
| 4,998,279 | * | 3/1991 | Weiss .................................... 380/23 |
| 5,151,684 | * | 9/1992 | Johnsen ................................ 340/572 |
| 5,276,444 | * | 1/1994 | McNair ........................... 340/825.33 |
| 5,313,556 | | 5/1994 | Parra . | |

(List continued on next page.)

FOREIGN PATENT DOCUMENTS

3731773 * 5/1989 (DE) ..................................... 235/382
4-135293 * 5/1992 (JP) ..................................... 235/382

OTHER PUBLICATIONS

"High–Tech Building Security", Siuru, Bill, *Popular Electronics*, Dec. 1996, pp. 39–42, 46.
"Who Goes There ?", Wyner, Peter, *Byte*, vol. 22, No. 6, Jun. 1997, pp. 70–80.
"No Place to Hide", Marsh, Ann, *Porhes*, Sep. 22, 1997, pp. 226–234.
"The Generation Gap", Vesley, Rebecca, *Wired*, Oct. 1997, pp. 53–56, 207.
Look. Forward, *Internet User Magazine*, Summer 1997, pp. 11, 12, 14, 21.

*Primary Examiner*—Michael G. Lee
*Assistant Examiner*—Diane I. Lee
(74) *Attorney, Agent, or Firm*—Roy, Kiesel & Tucker

(57) ABSTRACT

A system for identifying an individual is determined either by generating an identification profile based on a distinctive biometric characteristic possessed by that person (e.g. voice analysis, finger print, facial scan, DNA etc.), or by means of verifying some digital "signature" representation assigned to that person. The biometric information or digital signature may then be used in a variety of functions to enhance both the security and convenience of conducting electronic transactions. The system may provide an algorithm for creating a PIN number for use as a preliminary or secondary identification steps, and/or an algorithm for generating unique tone codes for use in personal identification via telephone or modem. Further, security of online transactions may be greatly improved by placing access key information in a medium outside the computer host or client. The system further provides a device that facilitates a user's ability to change codes or methods of generating codes instantly, without having to contact their bank, credit card company, etc."

2 Claims, 2 Drawing Sheets

U.S. PATENT DOCUMENTS

| | | | | |
|---|---|---|---|---|
| 5,386,103 | * | 1/1995 | DeBan et al. | 235/379 |
| 5,513,272 | | 4/1996 | Bogosian, Jr. | 382/116 |
| 5,552,777 | * | 9/1996 | Gokcebay et al. | 340/825.31 |
| 5,581,630 | | 12/1996 | Bonneau, Jr. | 382/116 |
| 5,594,493 | * | 1/1997 | Nemirofsky | 235/383 |
| 5,623,552 | * | 4/1997 | Lane | 3852/124 |
| 5,793,027 | * | 8/1998 | Baik | 235/380 |
| 5,815,658 | * | 9/1998 | Kuriyama | 235/379 |
| 5,825,871 | * | 10/1998 | Mark | 235/380 X |
| 5,825,882 | * | 10/1998 | Kowalski et al. | 235/380 |
| 5,870,724 | * | 2/1999 | Lowlor et al. | 235/380 X |

\* cited by examiner

PORTABLE SYSTEM FOR PERSONAL IDENTIFICATION BASED UPON DISTINCTIVE CHARACTERISTICS OF THE USER

TECHNICAL FIELD OF THE INVENTION

The present invention relates to novel, improved methods and systems for electronic personal identification. Specifically, this invention relates to methods and systems for providing an accurate means of identifying a particular known or unknown person that may be easily transported from location to location.

BACKGROUND

As the computer age has progressed in recent years, there has been a vast increase in the use of private electronic transactions. Banks, credit card companies and other financial institutions offer a wide variety of options and services that may now be conducted online. The ever expanding Internet has brought computerized home shopping to the forefront of cyber-technology. Consumers may now conduct a majority of their financial business in numerous ways that either did not exist, or were not available for use by the general public as little as five years ago. Some examples of such transactions include computerized home banking, the use of automatic teller machines, computerized stock transactions, credit or debit based product dispensers, security entrances, telephone access and transactions, long distance calling cards, identification cards (including any such card used for services like health care, insurance, automobile service accounts, etc.), and even secure transactions over the Internet.

The essence of any secret transaction, whether financial or not, is the ability to keep it private and secure from potential theft. Although computerization of transactions and improvements in technology have increased the ease with which consumers may conduct these private transactions, the nature of the technology is such that the information, when transmitted electronically, can be intercepted and used for criminal purposes. Consequently, as the usage of these kinds of electronic transactions has increased, a need for improved systems and methods to ensure their security has increased as well. Completion of most electronic financial transactions requires the use of a password or personal identification number (PIN) that identifies a person as one authorized to conduct a specific transaction. For example, most automatic teller machine (ATM) cards have a magnetic strip that, when read by the ATM computer, identifies the bank and the account to be accessed. The machine then asks for entry of the PIN which has been assigned to that account. If the correct PIN code is entered, the user may access the bank account to conduct a variety of transactions, including, withdrawals, deposits or requesting account statements.

There are several drawbacks to this approach. First, the PIN must be chosen when the account is opened, and may only be changed by bank personnel upon request by the user. Therefore, a person who hasn't realized that her ATM card was stolen may go days without requesting a new PIN number to be assigned to her account. During that time, the thief who stole her card may have discovered the PIN number, and made unauthorized withdrawals from her account. Second, the "choose-your-own" PIN code system is not sufficiently unique to provide adequately reliable identification. A person not the owner of an account who obtains knowledge of a PIN code may easily gain unauthorized access to that account because, all she or he needs to do is discover the four digit PIN code number associated with that account. While there are thousands of possible permutations or combinations of digits that could make up any one PIN code, the actual code is not specifically unique to that person. For example, two or more bank accounts at the same bank could theoretically have the same PIN code. As long as the correct PIN code is entered for the account sought to be accessed, the system does not care if the entered PIN code could also access other accounts as well, because it only focuses on the specific account number received from the ATM card's magnetic strip. The major fault with this system is that it does not truly identify the account holder, but allows access to anyone holding the card who also enters the correct identification number. In other words, the current system merely assumes that if the individual who attempts to use the card knows the correct PIN number, then that person is authorized to access the account. Therefore, the PIN code system does not offer the flexibility, security, and uniqueness that other forms of identification may offer. Specifically, the PIN code system cannot distinguish between users actually authorized to access the account, and unauthorized users that have discovered the correct PIN code.

In typical applications which require the use of a pass key to facilitate access, users are issued a key that contains a specific, pre-determined access code stored on a magnetic strip or other such storage device, and which de-activates a locking mechanism, alarm system, or other such device and allows the key holder to access whatever secure objective was being protected. Again, this method of restricting access provides flawed security because it fails to provide a means for positively identifying the user as an authorized user as a condition precedent to granting access to the secure objective.

Others have attempted to solve the security problem by creating means for identification based on a biometric character trait unique to specific users. Such character traits may include voice identification, fingerprint analysis, retina scan, DNA analysis, or other biometric characteristic. By utilizing technology which analyzes these types of character traits, systems have been developed which can more accurately identify specific persons. For example, the invention disclosed in Parra, teaches a method and apparatus for identifying a particular individual based on the uniqueness of the acoustic characteristics of his/her voice. According to Parra, the voice characteristics of the user are stored on a magnetic strip on the back of a card. When the card is inserted into the interface, the user is prompted to speak a word. The spoken word is then digitized and its acoustic characteristics compared to a stored digital version of the word. If the characteristics of the stored word match those of the spoken word, the user may be granted access.

There are several drawbacks to this approach. First, while the Parra invention attempts to address the security issue regarding uniqueness of identification characteristics, it does not address flexibility of use. The Parra system, like the PIN code system requires the use of a pre-programmed word or phrase that is compared to the spoken word or phrase. Parra offers no built-in ability to change the access word or phrase without going through bank personnel. Further, the Parra invention does not address tying the voice-identification to the generation of voice pattern-based numeric, alphanumeric or telephone tone codes for use in applications like telephone long distance credit cards, or Internet passwords, which would allow more widespread use of the identification technology. Finally, the Parra invention is specifically limited to a voice identification technology system, rather than relating to a non-platform specific system.

Online systems, such as those disclosed in the June, 1997 issue of *Byte* magazine (volume 22, number 6, pp. 70–80) rely on digital signatures, digital certificates and server-based verification of smart card electronic signatures in creating a high level of security for financial transactions and other secured access applications. These systems involve high-end algorithmic encoding of identification numbers which may then be sent to and from clients and servers during the authorization process. These systems, while providing high levels of security are not fool proof.

For "hash" signatures, both the client and server must have the access key to complete the encoding and decoding of the hashed data. This means that a security breach at either end (client or server) may result in a hacker's ability to obtain a forgery of the access key, and thereby, access to the client's restricted data or accounts.

Public-key algorithms, provide better security in that the server does not need to have a copy of the access key to verify a digital signature. The private key algorithms used to encode the data are known only to the client encryptor. However, the system of encoding and decoding is set up such that the server side can use a different decoder algorithm to verify the encoded signature. Therefore, the access key remains significantly more secure than a hash based signature, because it is only known to the client side, while the server can still authenticate it. Public-key algorithms, however, do not assure that the person using the key is the actual owner, rather than a forgery. The key is actually just a number; it bears no resemblance to the particular user, and carries no personal or unique data about the user. Further, the public key system requires a great deal of support and infrastructure, particularly in maintaining databases of all active and revoked certificates or keys.

SUMMARY OF THE INVENTION

It is an object of the present invention to provide an accurate electronic personal identification system which offers improved security and portability. It is a further object of the invention to provide an electronic personal identification system based on biometric ID analysis which provides improved security and portability. It is a still further object of the invention to provide an electronic transaction system which contains improved personal identification security, and which offers additional features to improve the ease and flexibility of use.

A preferred embodiment of the invention is a card or other small portable device that contains a device which positively identifies the cardholder as an authorized or unauthorized user, and thereby provides or prevents access to a specific secure objective (e.g. an ATM machine, security gate or door, computer scanning device, and other such accounts, areas or the like which require restricted access). The invention obtains the potential user's unique personal identification profile, preferably a digital representation of some uniquely identifying trait of the user, such as, but not limited to any biometric analysis system (e.g. fingerprint, DNA, palm print, retina scan, etc.), or other identification system which produces a digital profile that is sufficiently unique as to provide a reasonable degree of certainty as to identification. In a preferred embodiment of the invention, the device, circuitry or apparatus by which the system obtains the user's ID profile is contained on board the invention. However, the disclosed invention may receive and utilize an ID profile calculated by an outside system as well.

The identification profile created (or received) by the invention may be a numeric, alphanumeric, or other digital representation of the user's unique biometric or digital signature profile. The spontaneously created identification profile is then compared to any predetermined authorized profiles associated with the invention to determine if the user is authorized as one of the users assigned to that account. The invention anticipates that more than one "account" may be assigned to any particular embodiment of the invention (e.g. an ID card, bank account card, etc.), so that families, businesses, or other groups may share identification devices. In other words, members of a particular household may use each other's identification cards in order to promote flexibility of use.

Once authorization has been established, the digital representation of the identification value may be converted into one or more access codes which may be used to provide access to a particular one of any number of secure accounts or databases, restricted areas, or other secure objectives. This feature allows for the existence of individually secure "accounts" on multiple-user cards. Since several individual and group "accounts" may be stored on a single card or other small portable identification device, the creation of ID profile-based personal identification numbers (PINs) provides a means by which cards utilized for group accounts may also be utilized for individual accounts without risk of security breach.

For example, considering an embodiment of the invention as an ID card containing two different accounts, a group account may provide access to a residence or other shared secure objective, while on the same ID card, an individual account may provide individual access to a bank account. Any member of the group may use the ID card to access the residence. The card will be able to verify all of the group members' profiles as authorized to use the card to access the residence. However, if the bank account can only be accessed by a specific PIN code, which is based on the authorized user's ID profile, then any PIN code calculated using any other group members' ID code will not produce the PIN required to access the account, and other group members will be denied access to the bank account.

One preferred embodiment of the invention is a bank account or credit account "smart card" utilizing voice identification technology (similar to that disclosed in Parra), however, it may be noted that other biometric identification analyses may be used (such as fingerprint scan, iris scan, DNA, etc.). In the voice identification based system, the smart card converts the user's spoken words into a numerical value based on the user's unique digital acoustic characteristics. At the time a bank (or other financial institution) account is opened, the account holder speaks a predetermined phrase and/or several predetermined "code words" that are analyzed and converted into a base digital voice signature value. The account holder's account information (which may include the original voice profile) may then be stored on the card. The predetermined voice profile represents the unique ID profile associated with that account holder, and may be stored on the institution's main computer database, on the smart card, or both.

When the account holder wishes to access his account, he activates the on-board voice identification device, which analyzes his voice patterns to determine if he is authorized to use the card. Next, the user inserts the card into an ATM (or other device employed for accessing an account). The invention converts the user's spontaneous word or phrase into a voice print value. The voice print value is then compared with the predetermined ID profile stored on the ATM card, the online computer database, or both, for match or discrepancy range. If the user's voice pattern matches, or is within the acceptable discrepancy range assigned to the account, then the smart card may authorize the user to access the account. Otherwise, access to the account may be denied. The system may require the user to speak one of any specific code words previously recorded by the user, or may simply analyze any random words or phrases spoken by the account holder, depending on what kind of voice identification technology is employed by the financial institution, or stored on the card or other portable device.

Other uses for the disclosed invention may include such uses in conjunction with a healthcare services card, driver's license, or passport. As a healthcare services card the present invention may provide a quick and efficient means for positive identification and access to medical history. In emergency situations such information must be quickly obtained in order to provide safe and adequate diagnosis and treatment. Because many emergency patients arrive at the emergency room unconscious, the disclosed invention is particularly suited to allow ER physicians and nurses rapid access to important medical information that they would not otherwise be able obtain from the patient herself.

As used in conjunction a driver's license or passport, the disclosed invention has particularly important applications, not only for positively identifying a person, but also for allowing a police officer or other official access to information about a cardholder's criminal record, driving record, or other such information that may be useful for law enforcement or regulation of international travel.

The disclosed invention differs from the prior art in two important ways. First, the biometric identification device is preferably on board the card, rather than contained in the ATM machine. This allows the user to verify his identity before physically interacting with the account interface (e.g. ATM machine). Further, it facilitates the use of other features of the invention, such as remote control operation, as well as eliminating the need for expensive, onsite identification devices or systems. The card automatically identifies the user, verifies his status as authorized or unauthorized, and grants or denies access accordingly.

Second, the invention includes a feature which allows the creation of unique, secure PIN codes for use as preliminary or secondary verification of identification, and which allows multiple group and individual accounts to exist on a single card. For example, the card or system may include a device for creating a distinctive, and user-specific alphanumeric code based on the potential user's unique identification profile value. When the potential user activates the verification process, the spontaneously created identification value calculated from his profile is transformed by the invention into a specific code which can be used by the device protecting the secure objective as a secondary or supplemental means for positive identification.

A specifically useful application of this feature for financial transactions is the creation of secure PIN codes for ATM cards. This feature adds flexibility to such cards in that in the event of a malfunction of or mis-recognition by the primary identification method, the uniquely generated PIN code may still authorize access. This secondary ID method is equally secure, since it is generated according to the originally stored voice print or other ID characteristic. Also, as explained above, this feature allows for the existence and efficient management of multiple accounts on a single card.

Another difference from the prior art, is that the system of the present invention, as disclosed herein, may include a means for generating unique access codes for use in identifying a user via telephone or computer modem. Like the secondary PIN codes, the transmitted tone codes are generated according to the unique ID number assigned to the user's voice print, or other distinctive identification characteristic. Therefore, since the tone codes are unique to the user, they are more secure, and unusable by anyone other than the authorized user. Further, the ability to generate these tone codes provides a more flexible use of the disclosed invention, because compatible on-site equipment at an account location is not required. The card automatically generates the correct telephone tones corresponding to the account's access code, and thus providing access as if the code had been entered manually. This tone code is more secure, however, because it is only generated once identification has been established.

The disclosed invention may be integrated into existing portable electronic devices, like cellular phones, laptop computers, portable digital assistants (PDAs), calculators, electronic address books, etc., to increase the flexibility and portability for the user. For example, integration of the invention into a telephone particularly a cellular telephone) may be significantly useful. As described above, the invention may create specific tone codes for identification purposes, and may have a voice identification based ID system. By integrating the invention into a cellular (or other) telephone, the device can take advantage of components already present in the "host" device. In the telephone example, the device may use the phone's built in microphone and/or speaker system as the voice ID input. Additionally, any tone codes the device may create and transmit may be so created and transmitted by the phone's built in tone generator.

A preferred embodiment of the invention also includes the ability to update information (such as the algorithm used to create the specific identification number-based numeric, alphanumeric, or tone code associated with a particular account) each time the account is accessed. An account utilizing this feature is not issued a specific PIN code, but instead uses dynamic codes. Once the account has been accessed, the card stores a new algorithm to use the next time the account will be accessed. Upon subsequent use, the new algorithm converts the user's unique identification value into a completely new PIN code which the account database has already associated with the account at the prior transaction. This feature provides better security because any person not authorized to access the account, who may happen to obtain the PIN code on one occasion, will not be able to access the account, because the PIN code changes each time the account is accessed.

Alternatively, the account may be assigned a plurality of PIN codes, any of which may authorize access. The smart card may store the algorithms which produce these PIN codes from an authorized user's unique identification value. Each time the account is accessed, the access code generator uses a different, randomly chosen stored algorithm, to produce one of the acceptable account access codes. In this manner, the account may be further protected because a chance interception of one access code will not automatically grant authorization, since the same access code is never allowed twice in a row.

The invention as disclosed herein may also be easily integrated into existing renewal systems. The identification system may include the ability to store and/or calculate renewal dates, or the number of times a particular secure objective has been accessed in order to determine when the account must be renewed. For example, when an account card, pass key, etc. is issued, it may grant only limited access in that it remains active only for a specific period of time or for a particular number of accesses, until reactivated or reprogrammed. Each time the card or key is used, it may determine whether the access period has lapsed by determining whether the renewal date has passed, or whether the maximum number of accesses has been exceeded. The card or other device may be renewed via bio-metric identification, or may be reprogrammed, either directly or on line. In this manner, the system provides for increased security in that a card or other device will automatically cease to provide access upon expiration, so that anyone who manages to obtain unauthorized access using that card will be unable to renew it and continue gaining unauthorized access.

The above and other objects, advantages and features of the invention will become more apparent when considered in conjunction with the following specification and accompanying drawings.

DETAILED DESCRIPTION OF THE INVENTION

Figure 1:
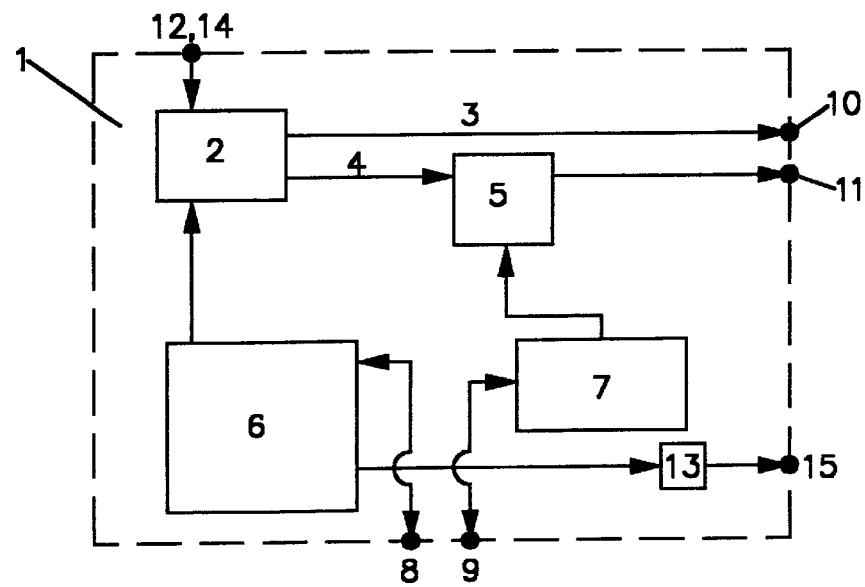
FIG. 1 shows a block diagram of a preferred embodiment of the disclosed invention.

Referring now to the drawings, and in particular, with reference to FIG. 1, there is shown a block diagram of a basic embodiment of the disclosed invention.

Enclosure 1 houses all of the components of the invention, and is of sufficient dimensions to be easily portable. The preferred embodiment includes an enclosure 1 that may be approximately the size of a credit card, debit card bank card or electronic smart card, or other small hand held portable device. Housed within enclosure 1 is the verifying means 2 which determines whether the person using the card is an authorized user of the card. In the preferred embodiment of the invention, input 12 receives analog identification information which is converted by verifying means 2 into a digital representation of the potential user's identification profile. In the preferred embodiment of the invention, the verifying means 2 on board the device captures and analyzes the user's identification profile. For example, input 12 may consist of a microphone for receiving the potential user's analog voice representation. Once received by input 12, analyzing means 2 converts the analog signal to a digital voice pattern identification profile. Which may then be compared to the user's actual voice profile for match or discrepancy range. The input 12 and analyzing means 2 are not limited to voice identification technology, but may include any identification method (including iris scan, fingerprint scan, DNA, or any other characteristic unique to individuals) which may be completely housed within the enclosure 1.

The invention, however, is not limited to including the ability to read and create an initial representation of the potential user's identification profile via the analyzing means 2. Input 12 may be merely a signal input which receives a predigitized identification profile, created by some outside analysis, for verification by analyzing means 2.

Although the preferred embodiment of the invention anticipates the use of some unique biometric characteristic of the potential user (e.g. voice print, fingerprint, DNA, palm print or other such unique biometric characteristic), the invention is not limited to biometric identification. Any personal profile, sufficiently unique to provide a reasonable probability of correct identification, and which is capable of being digitally represented and sent via electronic signal, may be utilized in the present invention.

After determining the potential user's ID profile, verifying means 2 outputs the calculated value on signal line 4. Next, verifying means 2 obtains any authorized profiles associated with the account from the built in storage medium 6, and then compares the stored profile to the potential user's spontaneously created profile. If the spontaneous profile calculated by verifying means 2 matches, or is within an acceptable discrepancy value range of any of the authorized profile stored in the built in storage medium 6, then the verifying means 2 generates a "Positive ID" signal on signal line 3. If the spontaneous profile determined by verifying means 2 does not match, or is not within an acceptable discrepancy range of any of the authorized profile stored in the built in storage medium 6, then verifying means 2 generates a "Negative ID" signal on signal line 3. Signal line 3 is output at output port 10, and informs the secure objective's database whether the potential user is authorized to use the card. Output port 10 transmits the "Positive ID" signal or "Negative ID" signal to the program, circuitry or other device associated with the secure objective that ultimately grants or denies access to the secure objective. For example, in ATM transactions, the existence of a "Positive ID" signal output from output port 10 would be read by the ATM's input signals, and would cause the ATM to grant the user access to her account. In other applications, the "Positive ID" or "Negative ID" signal may be used to grant or deny access to computer accounts, door entries, toggle alarm activator/de-activators, or other such secure objectives.

Signal line 4 transmits the identification profile spontaneously determined by verifying means 2 to code generator 5. Code generator 5 transforms the user's unique identification profile into a specific code which may be assigned to a user's specific secure objective (e.g. bank account, restricted room, database, etc.) as a preliminary, secondary or primary access code. Upon activation, code generator 5 uses an algorithm obtained from memory chip 7 to convert user's unique identification profile into an access code associated with the secure objective. For example, in ATM applications, the code generator would convert the user's unique identification profile into a four digit numeric personal identification number (PIN) code, which could then provide access to the account. Memory chip 7 may be any type of memory chip known in the art, and capable of storing multiple algorithms, including any programmable read only memory (PROM) or erasable programmable read only memory (EPROM), or other memory unit known in the art. Memory chip 7 may also be interchangeable or replaceable so that chips containing pre-stored algorithm may be used and replaced at the user's discretion. Alternatively, memory chip 7, if programmable and/or erasable, may be updated, reprogrammed or erased via input/output (I/O) port 9. It should be noted that while FIG. 1 depicts the usage of a separate programmable memory chip 7 to supply the code generator 5 with a code generating algorithm, such programmable memory chip 7 is not necessary for the invention. In another embodiment of the invention, the code generating algorithms may be stored on the built in storage unit 6, and accessed by the code generator 5 from there.

Once the user's unique identification profile has been transformed into an appropriate access code by code generator 5, the access code is output to output port 11 where it may be received by a secure objective to determine whether access is granted. The access code output at output port 11 may be used as a secondary, or alternative method of determining identification and authorization.

For example, a system for protecting secure areas of a building from unauthorized access may employ an embodiment of the disclosed invention employing fingerprint scan as the verifying means 2. As a back up or secondary means of identification, the system may require entry of a secure numeric access code. If, during use by an unauthorized user, the verifying means 2 improperly sends a "positive ID" signal, then the code generated by code generator 5, which is based on the user's actual digital fingerprint profile, and output at output port 11, would not match the code assigned to the authorized user's account. Consequently, based on the secondary identification process, the system would then deny the unauthorized user access to the restricted area. If the system relied solely on the "positive ID" or "negative ID" signal, then access would be improperly granted.

In addition to storing the users' identification profile(s), built in storage unit 6 may store information relating to the users' "accounts." Such information may include financial information including balances, withdrawals, deposits, transfers, credit purchases, and other such information, renewal dates, access statistics, and other information. In addition, as indicated above, built in storage unit 6 may also store code generating algorithms used by code generator 5 to generate user identification-based access codes for use as alternative or secondary verification. The built in storage unit 6 may be any storage medium known in the art to which data is capable of being written and re-written. Further, storage unit 6 may be removable and interchangeable to provide increased capacity at the user's option. Input/output port 8 provides easy updating and downloading to or from built in storage unit 6 by any computer, ATM machine, facsimile machine, satellite transmitter, or other devices or processors capable of being used to transmit electronic data.

Remote control unit 13 allows the identification device to be used in a variety of ways from a remote location (for example, as a key pass, or a user specific car alarm remote control key, or even highly interactive functions such as remote control use at an ATM machine). Input 14 is a button, or series of buttons that send account specific information via infrared, microwave, or other such signal, and which may be received and processed by the secure objective (e.g. ATM machine, door lock, auto alarm, etc.). Additionally, remote control unit 13 may remotely send information on signal line 3, which includes the "positive ID" or "Negative ID" signal and/or the unique access number (e.g. identification number, PIN code, etc.) created from the user's unique identification profile.

In a typical application, the remote control unit 13 may act as a pass key to a restricted area. For example, access to a particular room in a building may be restricted to particular persons. The remote control unit 13 may be utilized to send the "Positive ID" or "Negative ID" signal (for example, via infrared signal or other remote control signal known in the art) as the potential user approaches the secured area. When the electronic lock receives a "Positive ID" signal, it may release the locking mechanism, allowing the verified user to immediately access the restricted area, without having to insert a key, card or other access device.

Figure 2:
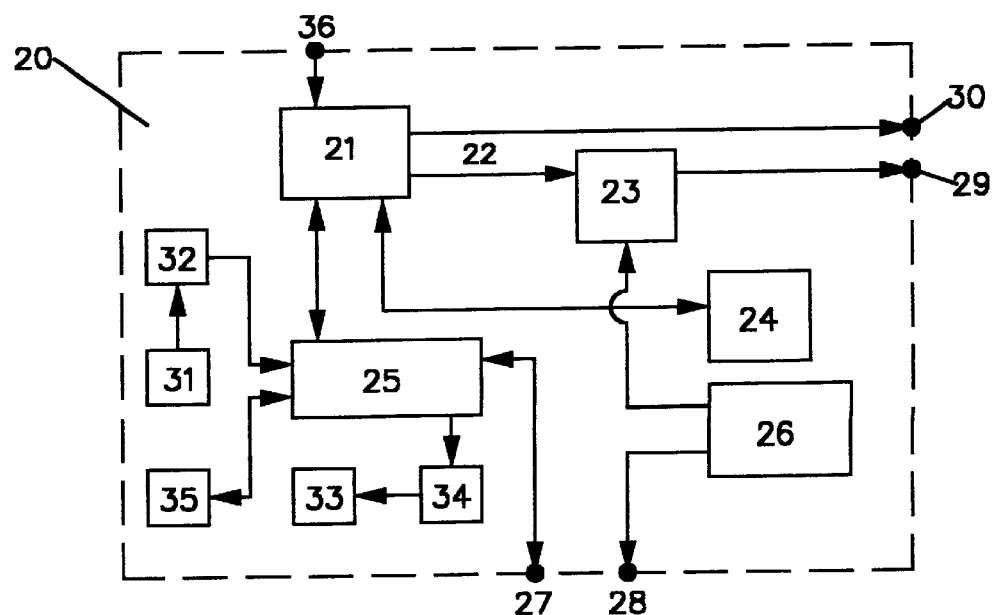
FIG. 2 shows a block diagram of the embodiment of the invention from FIG. 1 with a combination of advanced features.

FIG. 2 shows a preferred embodiment of the invention in a typical application as an identification card for use with ATM accounts, credit card accounts, debit accounts, or as a driver's license, passport, or other such form of identification.

Enclosure 20 houses the components, and may be approximately the same size and dimensions as a typical credit card or other bank card; or depending on the area needed for all of the component parts, of sufficient size and dimension to accommodate the components, provided that the card is still easily portable. Inside enclosure 20, verifying means 21 operates exactly as verifying means 2 from FIG. 1. The verifying means 21 receives the spontaneous identification input (e.g. voice sample, fingerprint sample, digital signature, etc.) at input 36 and converts it into a digital representation. Verifying means 2 may include any and all technology necessary to perform the actual biometric scanning, analysis, or may receive the spontaneous profile information from an separate identification device. Next, verifying means 21 fetches the authorized identification profile(s) assigned to the account from built in storage medium 25 (or from a central database) and compares it (them) to the spontaneously created profile derived from the biometric analysis for match or discrepancy range. Upon match or sufficiently close discrepancy range, a "Positive ID" signal is output at output 30. Upon mismatch or unacceptable discrepancy range, a "Negative ID" signal is output at output 30.

Code generator 23 operates similarly to code generator 5 from FIG. 1 in that it creates an access code based on the potential user's spontaneously created identification value for use with a specific account. Programmable memory unit 26 provides the code generator 23 with code generating algorithms which it utilizes to calculate the account specific access codes. As described above, programmable memory chip may be updated by computer or by a financial transaction machine (e.g. ATM machine) as outlined above.

FIG. 2, however, introduces an encrypting means 24, which may be utilized to securely encrypt either or both the spontaneously calculated identification value, and the access codes generated by code generator 23. Secure encryption by encrypting means 24 ensures that identification values and access codes may not be intercepted upon transmission between the smart card and the transaction machine. Secure encryption of the spontaneously calculated identification value by encrypting means 24 may occur before or after comparison of the spontaneously calculated identification value and the stored account identification value.

Built in storage medium 25 may be of the same type as that shown as storage medium 6 from FIG. 1. In the preferred embodiment, storage medium 25 in FIG. 2 is divided into specific areas for storing specific data. One area of storage medium 25 may store account information, including account or credit balances, recent withdrawals and/or deposits or payments, and other such account related information. Storage medium 25 may be further divided in to areas which store identification profile information which may be read by verifying means 21 for use in determining authorization. Also, storage medium 25 may set aside storage space for storing other externally received, non-account specific electronic data.

For example, storage medium 25 may include an area for storing audio data. The invention as disclosed in FIG. 2 includes a built in digital voice memo recorder for creating, storing and playing back digital audio memo files.

User speaks into microphone 31, which converts the sound into electronic signals that may be digitally recorded by recording unit 32 onto built in storage 20 medium 25. Sound memo files recorded to the storage medium 25 may be replayed by the smart card (or other portable device) as well. Retrieval means 34 retrieves stored digital audio data from storage medium 25 and converts the sound to analog signals that are transmitted to acoustic speaker 33, which allows the user to hear the sound files stored to storage medium 25. Remote control unit 35, input 36, and output 37 act in precisely the manner as their counterparts in FIG. 1 (remote control unit 13, input 14, and output 15).

The typical application of remote control unit 35 in ATM transactions may greatly increase the safety of the user from potential muggings and robberies. Using the invention, the user can transmit access information as well as interactive information from output 37. Once access has been granted, the user can use input 36 (which may be a button or series of buttons) to select from among a plurality of functions on the ATM screen menu, and conduct other such business from a locked car, while exposing herself only to the extent necessary (if at all) to quickly retrieve cash, make a deposit, or collect a receipt. Remote control unit 35, therefore, allows for better user protection in that a drive-up ATM user would not have to expose himself or herself to the threat of lurking bandits for long periods of time in order to conduct a financial transaction.

Figure 3:
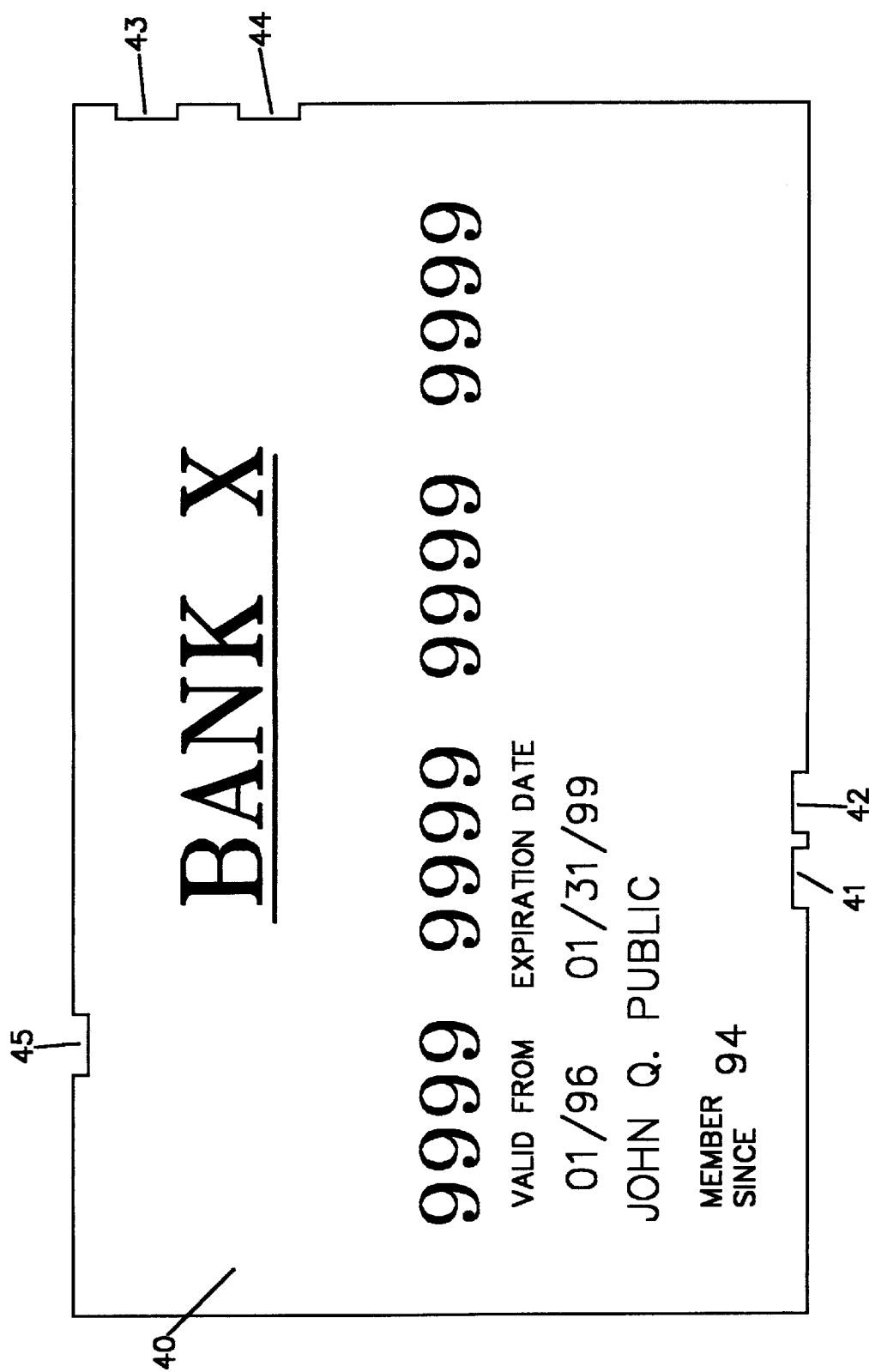
FIG. 3 shows the outside of the enclosure of the invention as embodied in an ATM card, a credit card, or a check card issued by a financial institution.

FIG. 3 depicts the surface of the enclosure of the disclosed invention from FIG. 2 in a typical application as a bank ATM card, credit card or debit card. In a preferred embodiment of the invention enclosure 40 appears to be similar to a normal credit card or ATM card in both size and dimension. However, the card may be larger (longer, wider, deeper, or a combination of the three) than a typical credit card to accommodate the component parts. Rather than (or in addition to) the magnetic strip commonly placed on the back of ATM cards, debit and credit cards, and other smart cards, the enclosure 40 has one or more output and/or input/output ports 41–44 on its edges. The ports 41–44 in FIG. 3 allow the enclosed invention to interact with a computer or other machine (e.g. ATM, computerized gas pump, etc.) to determine whether access shall be granted; or to download and/or update account information, code generating algorithms or other data.

Input 45 corresponds to the identification input 36 from FIG. 2. In FIG. 3, input 45 is a fingerprint scanning pad. The potential user places her thumb (or any of her fingers) onto the fingerprint pad input 45. The verifying means housed within the card scans the fingerprint data at input 45, analyzes the print, and creates a digital representation of the print which may then be compared to the fingerprint profile of any authorized cardholder stored on the card, in an on-line database, or with on-site access equipment.

Input 45 is not limited to the reception of fingerprint data. Input 45 may be capable of receiving any type of identification data known in the art, including, but not limited to biometric identification data (e.g. voice identification, iris scan, palm scan, DNA, etc.), or any electronic identification data (e.g. electronic certificate data, digital signatures, or other secure digital identification data).

Button 46 is utilized with the remote control function to allow the user to access an account, and to select available functions to manage the account. It is not necessary that button 46 be a single button. Instead, the invention may utilize a series of button like button 46 to perform functions such as selecting functions, scrolling a cursor, or other such function as may be necessary to the operation of the ATM or other such machine.

What is claimed is:

1. A portable identification system comprising a storage medium for storing electronic data; one or more inputs; one or more outputs; a verifying means for determining user authorization or non-authorization, said verifying means receiving data from at least one of said one or more inputs, which data is derived from biometric or other distinctive characteristics of the user, said verifying means generating an identification profile for each user, wherein said identification profile is determined from said data, and a code generator employing at least one code generating algorithm for generating one or more access codes based upon said identification profile wherein at least one of the said one or more access codes is an identification specific digital signature.

2. The system of claim 1, wherein said digital signature may be encoded for secure transmission.

* * * * *